Oct. 22, 1935.        A. C. MONTEITH        2,018,218

REGULATING SYSTEM

Filed March 1, 1933

WITNESSES:
Leon J. Taja
C. F. Bryant

INVENTOR
Alexander C. Monteith.
BY
Franklin E. Hardy
ATTORNEY

Patented Oct. 22, 1935

2,018,218

UNITED STATES PATENT OFFICE 2,018,218

REGULATING SYSTEM

Alexander C. Monteith, Wilkinsburg, Pa., assignor to Westinghouse Electric & Manufacturing Company, East Pittsburgh, Pa., a corporation of Pennsylvania Application March 1, 1933, Serial No. 659,123

10 Claims. (Cl. 171—312)

My invention relates to regulating systems and it has particular relation to excitation-control systems for dynamo-electric machines suitable for applications in which it is necessary or desirable to initiate excitation changes by a machine characteristic other than voltage.

When dynamo-electric machines are utilized in certain applications, it is found inadvisable because of system operating practice to automatically initiate excitation changes directly in response to variations in machine voltage, as is done in many regulating systems. It is to the provision of particular initiating means applicable to the situations above mentioned that my invention is primarily directed.

One object of my invention is to provide a regulating system for a dynamo-electric machine in which excitation changes are initiated by predeterminedly sudden changes in the machine field winding current, such as are set up by rapid variations in machine armature winding or load current.

Another object of my invention is to provide a regulating system of the type described in which excitation changes are initiated in response to given conditions of machine loading, such as result from excessive or other predetermined variations in load demand.

A further object of my invention is to provide a regulating system in which excitation control may be initiated jointly either by sudden impulses in machine field current or by predetermined conditions of the machine loading.

An additional object of my invention is to provide, in a quick-response excitation system for a dynamo-electric machine, means for protecting the machine and the machine exciter from sustained overload during excitation-forcing operations.

Another object of my invention is the provision, in a regulating system capable of rapidly increasing machine excitation during abnormal conditions, of means for interrupting such excitation-increase after a predetermined time in order to prevent sustained operation of the machine under adverse conditions.

A still further object of my invention is to provide, in a system of the type described, means for controlling the excitation in accordance with the machine loading in a manner that sustained machine operation under adverse conditions will be minimized.

My invention, together with additional objects and advantages thereof, will best be understood from the following description of specific embodiments when taken in conjunction with the accompanying drawing, in which Figure 1 is a diagrammatic view of apparatus and circuits illustrating the regulating system of my invention applied to an alternating-current generator of a frequency changer set.

Figure 1:
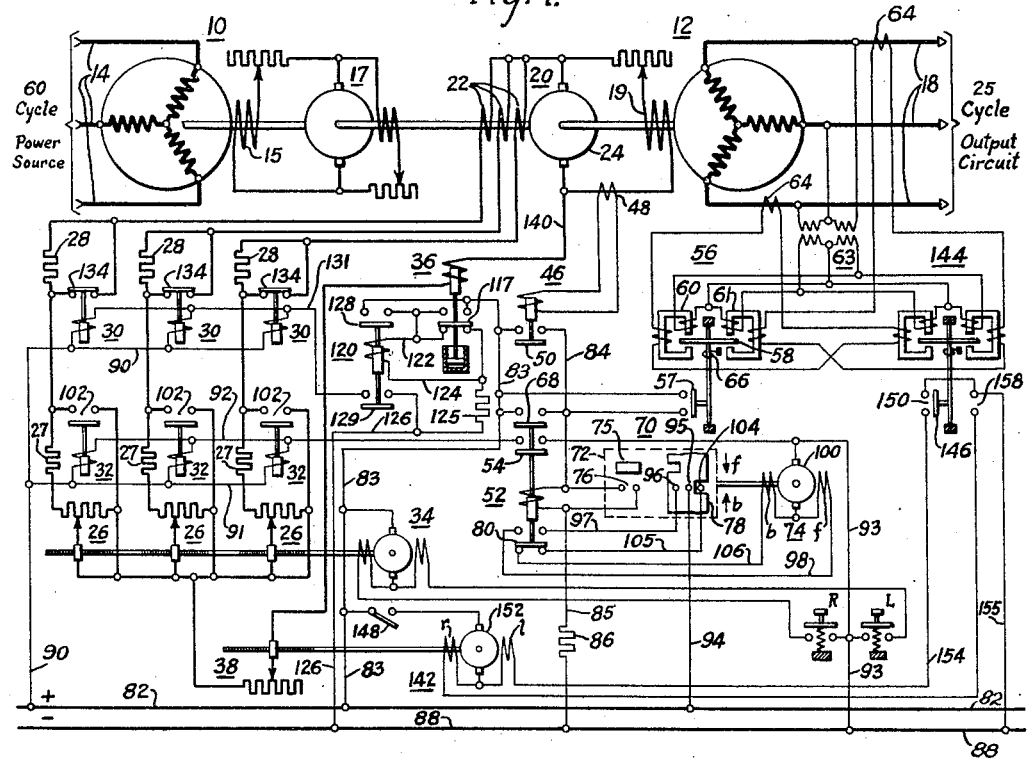

Referring to the drawing, and particularly to Fig. 1 thereof, the frequency changer set with which the regulating system of my invention is illustrated is shown as comprising a synchronous motor 10 mechanically connected to drive an alternating-current generator 12. The motor 10 comprises armature windings directly connected to a power circuit 14, and a field winding 15 which may be energized from any suitable source of direct current, such as an exciting generator 17. The generator 12 similarly comprises armature windings directly connected to the conductors 18 of an output circuit, and a field winding 19 which is energized by direct-current from an exciter 20.

It will be recognized that a frequency changer set of the type described is employed when it is desired to supply a system of one frequency, such as of 25 cycles, from a source of power of another frequency, such, for example, as of 60 cycles. For purposes of explanation, it will be assumed that the pull-out characteristics of the synchronous motor 10 in the system of Fig. 1 are considerably higher than those of generator 12 so that only the excitation of generator 12 need be specially controlled by the regulating system of my invention to prevent loss of synchronism and other undesirable effects upon the occurrence of sudden or excessive over-loads or other abnormal operating conditions, such as faults in the load circuit. It will be appreciated, however, that the regulating system of my invention about to be described as acting upon the machine 12 only, may also be applied to control the excitation of the machine 10, or of both machines 10 and 12, if desired. Furthermore, it will become evident as the description proceeds that the system of my invention may be applied to dynamo-electric machines of all types, direct current as well as alternating current, and to motors as well as to generators, it not being restricted to synchronous machines of motor-generator sets of the frequency changer type with which it is illustrated.

In order that the exciter 20, the armature winding 24 of which is directly connected to energize the field winding 19 of the regulated machine 12, may be capable of rapidly changing its voltage, it is provided with a field winding of low time-constant characteristics. This winding is shown as comprising a plurality of parallel connected sections 22. Current for energizing field windings 22 is supplied from the exciter armature winding 24, through a circuit which includes a relay 36, a rheostat 38, rheostat 26, field-forcing resistors 27 and current-limiting resistors 28. The current-limiting resistors 28 are normally shunted through the contact members of the relays 30. The field-forcing resistors 27 are normally in the energizing circuit of the windings 22 and are shunted therefrom upon closing of the relays 32.

The rheostats 26 control the normal excitation of the exciter 20 and, as shown, are simultaneously operated by a suitable motor 34 which may be operated in excitation raising and lowering directions by selectively closing push button control switches R and L, respectively. These switches are manually operated by an operator, who, by means of them, adjusts the excitation of the machine 12 to the value most suitable for normal load demands on the machine. The relay 36 and the rheostat 38 are included in the field winding circuit of the exciter 20 for a purpose to be later explained.

Figure 2:
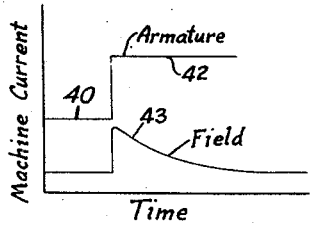
Fig. 2 is a diagram of curves illustrating the effect of rapid changes in the armature winding current of a dynamo-electric machine upon the field winding current thereof.

In a dynamo-electric machine of the type represented at 12, a sudden change of load produces, as is known, a sharp fluctuation in the machine field winding current. This is due to a "transformer action" which results from the inductive relation between the armature and field windings of the machine. One example of this action is graphically shown by the curves of Fig. 2 in which the lower portion 40 of the armature current curve represents the normal loading of the machine 12 while the raised portion 42 of this curve represents a materially increased value of current which may be drawn when the machine load is greatly raised. Because of the rapid rise in armature winding current, the field winding current is caused to rise in the manner indicated by curve 43 of Fig. 2. It will be understood that a sudden decrease in armature current will similarly cause a sudden drop in the current acting in the field winding circuit.

Field current fluctuations resulting from sudden changes of load may, therefore, be utilized by actuating a relay which is properly designed to be responsive to them to initiate an excitation change in the same manner as do machine voltage responsive relay devices which have been so extensively applied in the past. In Fig. 1, such a combination is shown as comprising a relay 46 which is responsive to current flow. The operating winding of this relay is connected with a current transformer 48 connected in the machine field winding circuit in such manner that current fluctuations, resulting from sudden increases in machine load, cause the relay 46 to operate a contact member 50 thereof to its circuit closing position. The current transformer 48 is designed to continuously carry direct current without over-heating or over-saturating its magnetic circuit.

The relay 46 by contact member 50 thereof, controls the operation of an intermediate relay 52 which, in turn, controls, by means of a contact member 54, the operation of the field-forcing relays 32 in a manner to be more completely described.

In order that the rapid-acting excitation adjusting equipment may also be made responsive to changes in, or excessive increases in the loading of the regulated machine 12 which are not sufficiently fast to effect the operation of the field current change responsive relay 46, I additionally provide a watt regulator comprising a machine-loading responsive relay 56 having a contact member 57 disposed in parallel circuit relation with the contact member 50 of the relay 46 in the operating circuit of the intermediate relay 52. The relay 56 is illustrated as a well known induction type of polyphase watt-meter device having a conducting material disk 58 which is subjected to sweeping flux set up by the magnetic members 60 and 61 that are excited by windings suitably energized in accordance with the voltage and current acting in the machine-connected circuit 18 through the medium of potential and current transformers 63 and 64 respectively. When the loading of machine 12 attains a predetermined value, the torque exerted upon the disk 58 overcomes the opposing action of a spring 66 and biases the contact member 57 into engagement with the cooperating contact members represented at the left thereof.

In order that the initiating impulses controlled by the relay devices 46 or 56 remain effective for a sufficient time to allow the excitation of the machine 12 to properly increase, an intermediate relay 52 is provided with a self-locking contact member 68 which serves to hold this relay in its energized or upper position until a timing relay device 70 returns it to its deenergized or illustrated position. In the particular application under consideration, a time delay of several minutes has been found desirable and hence the relay 70 is illustrated as being of the type capable of providing such an appreciable delay.

As shown, the relay 70 comprises a drum assembly, shown in developed form at 72, that is rotated at a slow rate of speed by a suitable reversible motor 74. The drum 72 carries a segment 75 which, when moved downwardly in the diagram, from the normal at rest position illustrated, by the action of the motor, engages, after a predetermined time, a pair of contact studs 76 to complete a shunt connection in shunt relation to the actuating winding of the intermediate relay 52. The drum 72 also carries a segment 78 which, together with the three contact studs shown in association therewith, and a contact member 80 carried by the intermediate relay 52, controls the energization of the drum operating motor 74 in such manner that, upon the operation of the intermediate relay 52, to its upper position, the drum will move the segment 75 downwardly into engagement with studs 76 and upon the return of relay 52 to its lower or illustrated position, the motor will reverse and move the segment 75 back to its normal or at-rest position illustrated.

To explain the operation of the elements of the regulating system thus far described, it will first be assumed that the motor-driven generator 12 is supplying load of normal magnitude for which the rheostats 26 are appropriately set to provide the proper excitation. A sudden increase in the armature current of the machine 12, whether caused by a circuit fault or by an increase in the load demand, causes, by the transformer action before explained, a fluctuation in the current in the circuit of the field winding 19, which fluctuation induces in the transformer 48 a potential that causes the relay 46 to close. The contact member 50 of this relay, accordingly, completes an energizing circuit for the winding of the intermediate relay 52 that extends from the supply conductor 82 through conductor 83, contact member 50, conductor 84, the winding of the relay 52, conductor 85 and resistor 86 back to the supply conductor 88. The intermediate relay 52 accordingly, biases the movable element thereof upwardly establishing through the contact member 68 a holding-in circuit and completing through the member 54 an energized circuit for the actuating windings of the field-forcing relays 32. This circuit extends from one supply conductor 82 through conductors 90 and 91, the windings of relays 32, conductor 92, contact member 54 of relay 52 and conductor 93 back to the other supply conductor 88. By means of contact member 80, relay 52 also completes an energizing circuit for the drum rotating motor 74 of timing relay 70, which circuit extends from control conductor 82 through conductor 94, contact studs 95 and 96 bridged by segment 78, conductor 97, contact member 80 of relay 52, conductor 98, field and armature windings f and 100 of motor 74 and conductor 93 back to control conductor 88. The motor accordingly rotates the drum of timing relay 70 in a direction which causes segment 75 to approach studs 76.

The completion of the control circuits for the field-forcing relays 32 by the contact member 54 of the intermediate relay 52 biases their contact members 102 upwardly and establishes a circuit in shunt to the shunt resistors 27 and the active portions of the rheostats 26. This shunt connection very greatly reduces the resistance of the energizing circuits for the exciter field windings 22 and, accordingly causes the exciter voltage to rapidly rise at a rate sufficient to maintain the excitation of the regulated machine 12 at a value which prevents the machine from falling out of synchronism with the frequency of the circuit to which it is connected.

The field-forcing relays 32 remain energized until the segment 75 of the timing relay 70 has moved into engagement with the studs 76 to establish a circuit in shunt relation to the winding of the intermediate relay 52, which causes the movable element of this relay to return to its deenergized position thereby allowing the field-forcing relays 32 to open. In practice, as has been mentioned, this period of time may be of the order of several minutes.

The contact member 80 of the relay 52 when in its lower position completes a circuit for energizing the motor 74 through the field winding b which causes the motor to rotate the drum of the timing relay 70 in the reverse direction and return the segment to the at-rest position illustrated. This circuit extends from the supply conductor 82 through conductor 94, studs 95 and 104 bridged by the segment 78 in its lower position, conductor 105, contact member 80 of the relay 52, conductor 106, field and armature windings b and 100, respectively, of the motor 74 and conductor 93 back to the supply conductor 88. When the relay drum segments are moved upwardly to the at-rest position illustrated, a portion removed from segment 78 allows the segment to discontinue contact with stud 104 thereby interrupting the motor energizing circuit which stops the drum in that position. In this connection, it should be noted that during the previously described operation in which the drum segments were moved downwardly, when the segment 75 came into engagement with the studs 76, the segment 78 separated from the stud 96 because of a portion removed therefrom, and thereby interrupted the motor circuit to stop the drum in that position.

Excitation-increasing impulses may be initiated not only by the relay 46 that is responsive to field current-changes in the manner just described, but also by the relay 56 that is responsive to machine load changes. As already explained, the relay 56 is provided for the purpose of controlling initiating impulses when the load demand on the regulated machine increase is of such gradual nature that the relay 46 cannot respond to it, it being readily understood that the machine loading might be gradually increased until the point of pull-out for a synchronous machine, for example, would be reached. The relay 56 is, in such a situation, set to actuate its contact member 57 before the pull-out or other critical load of machine 12.

Figure 3:
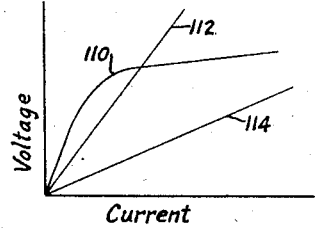
Fig. 3 is a diagram of curves illustrating certain characteristics of the exciting generator which energizes the field winding of the dynamo-electric machine, shown in Fig. 1.

The greatest rapidity of the the exciter voltage increase is attainable when the block of resistance shunted by the field forcing relays 32 is large, the magnitude preferably being such that at the start of the excitation increase the difference between the saturation curve and the field circuit characteristic of the exciter is relatively great. Such a condition is graphically depicted in Fig. 3 in which the saturation curve of the exciter 20 is represented by 110, a field-circuit characteristic within the range of normal operation by 112 and a field-circuit characteristic desired at the start of an excitation-increasing operation by 114. Characteristic 114 represents such a low resistance that were the self-excited exciter 20 allowed to operate continuously under these conditions, serious over-heating of the field windings 22 would result. To guard against this, the previously mentioned current limiting resistors 28 are inserted in the field winding circuit of the exciter 20 when the magnitude of the winding current reaches a predetermined value. It will be apparent that this protective feature is also applicable to direct-current generators of the separately-excited type in that by its use the field current may be limited after it has built up to a given value.

The current-responsive relay 36 which is disposed in the field winding circuit is so set that when the winding current approaches a dangerous value, a contact member 117 of the relay, which preferably possesses time delay characteristics, will start to move upwardly. When its extreme upward position is attained, this contact member completes a control circuit for a second relay 120 which circuit extends from the supply conductor 82 through conductor 83, the contact member 117, conductor 122, the winding of relay 120, conductor 124, resistor 125 and conductor 126 back to the supply conductor 88.

The relay 120, accordingly, moves its contact members 128 and 129 upwardly establishing through the member 128 a holding-in circuit and completing through the member 129 an energizing circuit for the operating windings of the current-limiting relays 30 which extends from the supply conductor 82 through conductor 90, the windings of relays 30, conductor 131, contact member 129 and conductor 126 back to the supply conductor 88. Thus energized, relays 30 interrupt, by means of contact members 134, the circuits which normally shunt resistors 28 and, by causing the field winding current of the exciter 20 to pass through these resistors, materially reduces the magnitude of this current.

When the exciter field current has been reduced to below the value to which relay 36 is responsive, which reduction may result either directly from the operation of the current-limiting relays 30 or from the openings of the field-forcing relays 32, after several minutes' time delay, by the relay 70, the contact member 117 of the relay 36 starts to move downwardly and, after a short interval, reaches the position illustrated in which it completes a circuit shunting the actuating winding of the relay 120 thereby causing the relay 120 to move its contact members downwardly and interrupt, through the member 129, the control circuit for the current-limiting relays 30. This allows these relays to reestablish the normally maintained shunt circuits around the current-limiting resistors 28.

Figure 4:
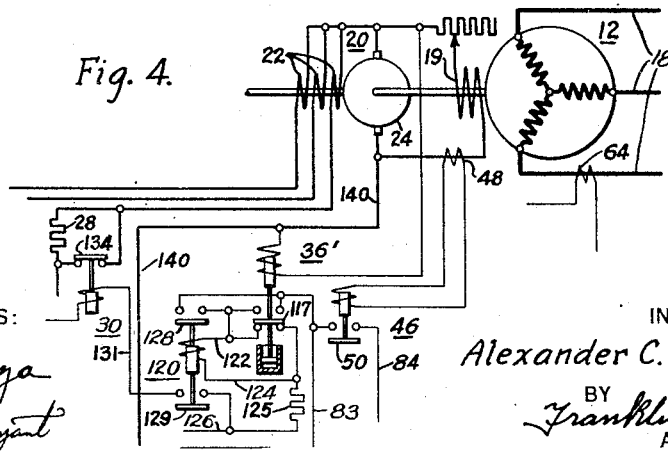
Fig. 4 is a partial reproduction of the system of Fig. 1 in which the exciter protective relay is shown as being responsive to the voltage of the exciter rather than to the field winding current.

Instead of controlling the current limiting relays by means of the relay 36, which is directly responsive to the field winding current of the protected exciter, equivalent results may be obtained by substituting for the relay 36 a device which is responsive to the voltage of the exciter. Such a modification is illustrated in Fig. 4 in which the relay 36 is replaced by a voltage responsive device 36', the operating winding of which is influenced by the voltage appearing across the armature winding 24 of the exciter 20. Since the voltage of the exciter is a measure of the field winding current, a proper calibration of relay 36' will cause it to function in a manner closely comparable to that of the current responsive relay 36 shown in Fig. 1. When so substituted, the circuit for energizing the field windings of the exciter is carried directly to the rheostat 38 by means of conductor 140 instead of being taken through the operating winding of the current responsive relay 36.

Another feature of the regulating system of my invention is the provision of means for automatically adjusting the excitation of the regulated machine in accordance with the machine loading. In the system of Fig. 1, such means are illustrated as comprising the rheostat 38 already mentioned, which is operated by means of a motor 142 which, in turn, is controlled by a machine-influenced watt meter device 144 illustrated as being a duplicate of device 56 already described, with the exception that the contact member 146 thereof is disposed in association with two sets of stationary studs.

In the event that it is desired to utilize this added feature, a control switch 148 is closed thereby rendering the rheostat motor 142 responsive to the watt-meter device 144 upon the occurrence of an abnormal machine load circuit condition, such as may result from an operation of the quick-response excitation-raising means already described. The increased machine loading causes the device 144 to bias the contact member 146 into engagement with the stationary studs 150, which completes an energizing circuit for the motor 142 extending from the supply conductor 82 through conductor 83, switch 148, armature and field windings 152 and 1, respectively, of the motor 142, conductor 154, studs 150 bridged by the contact member 146 and conductor 155 back to the supply conductor 88.

The motor 142, accordingly, operates the rheostat 38 in an excitation lowering direction and gradually reduces the excitation to a value appropriate for the machine loading.

Assuming that the abnormal condition of the machine loading now subsides, or that the quick response excitation rising action is discontinued by operation of the timing relay 70, the loading of the machine 12, accordingly, drops, and, as a result, the meter device 144 biases the contact member 146 into engagement with the stationary studs 158 to energize the rheostat motor 142 to operate in the reverse or excitation raising direction. This energizing circuit is similar to the one just traced, except that it includes the motor field winding r and relay studs 158 instead of those before named.

The above-described equipment for balancing the excitation with the machine output is principally applicable to situations in which the regulated machine operates in parallel with other power sources in such manner that it supplies a load which in value normally remains between given upper and lower limits. In such case, the watt meter 144 is set to respond only when one or the other of these normal range limits is exceeded. In conjunction with the motor operated rheostat 38, it thereby acts to maintain the output of machine 12 within the given range mentioned. For situations in which the regulated machine must supply an output not so restricted but of widely varying character, this balancing equipment is inapplicable and may be rendered inoperative by opening the control switch 148.

Although I have shown and described certain specific embodiments of my invention, I am fully aware that many further modifications thereof are possible. My invention, therefore, is not to be restricted except insofar as is necessitated by the prior art and by the scope of the appended claims.

I claim as my invention:

1. In combination with a dynamo-electric machine having excitation-adjusting means associated therewith, means responsive to a predetermined rate of change in the machine-exciting current and to the machine load for initiating operation of said adjusting means, and means for causing each operation so initiated to be continued for a predetermined time.

2. In combination, a dynamo-electric machine having a field winding, means for energizing said winding, means for rapidly increasing the winding-energizing current, means-responsive to sudden impulses in the winding current and to predetermined overloads on the machine for initiating an operation of said winding-current-increasing means, and means for causing each operation so initiated to be continued for a predetermined time.

3. In combination with a direct-current generator having a field winding, a source of energization for and a circuit connecting the source with said field winding, means for rapidly increasing the field winding current, and protective means for the generator comprising a resistor, means for inserting the resistor into the field-winding circuit when a characteristic of the generator attains for a given appreciable time a predetermined excessive value, and means for removing said resistor from the circuit when the said characteristic again falls and remains below the said predetermined value for a given appreciable time.

4. In a regulating system comprising a dynamo-electric machine having excitation-adjusting means associated therewith and means responsive to predetermined changes in a machine characteristic for effecting a rapid increase in machine excitation, the combination of means for interrupting said excitation increase after it has been in progress for a predetermined time.

5. In a regulating system comprising a dynamo-electric machine having excitation-adjusting means associated therewith and means responsive to predetermined changes in a machine characteristic for effecting a rapid increase in machine excitation, the combination of means for interrupting said excitation increase after it has been in progress for a predetermined time comprising a timing relay device associated with the said excitation-increasing means.

6. In a regulating system comprising a dynamo-electric machine having excitation-adjusting means associated therewith and means responsive to predetermined changes in a machine characteristic or effecting a rapid increase in machine excitation, the combination of means for continuing said excitation increase after the said predetermined characteristic changes have subsided and means for interrupting said excitation-increase after it has been in progress for a predetermined time.

7. In a regulating system for a dynamo-electric machine having a field winding, the combination, with a circuit for energizing said winding and means for adjusting the current supplied thereto, of a control device responsive to predeterminedly sudden variations in the current which acts in the field winding circuit for initiating operation of said adjusting means, and a timing device for causing each initiated operation to be continued for a predetermined time.

8. In combination, a dynamo-electric machine having a field winding, a circuit for energizing said winding, means for rapidly increasing the winding-energizing current, a control device responsive to predeterminedly sudden variations in the current in the winding circuit for initiating operation of said current-increasing means, and a timing device for causing each initiated operation to be continued for a predetermined time.

9. In a regulating system for a dynamo-electric machine having a field winding, the combination, with a circuit for energizing said winding and means for adjusting the current supplied thereto, of a control device responsive to predeterminedly excessive loadings of the machine for initiating operation of said adjusting means, and a timing device for causing each initiated operation to be continued for a predetermined time.

10. In combination, a dynamo-electric machine having a field winding, a circuit for energizing said winding, means for rapidly increasing the winding-energizing current, a watt-responsive relay acted upon by the voltage and current of said machine and responsive to predetermined excessive overloads thereon, for initiating operation of said current-increasing means, and a timing device for causing each initiated operation to be continued for a predetermined time.

ALEXANDER C. MONTEITH.